INVENTOR.
GEORGE T. TOMINAC

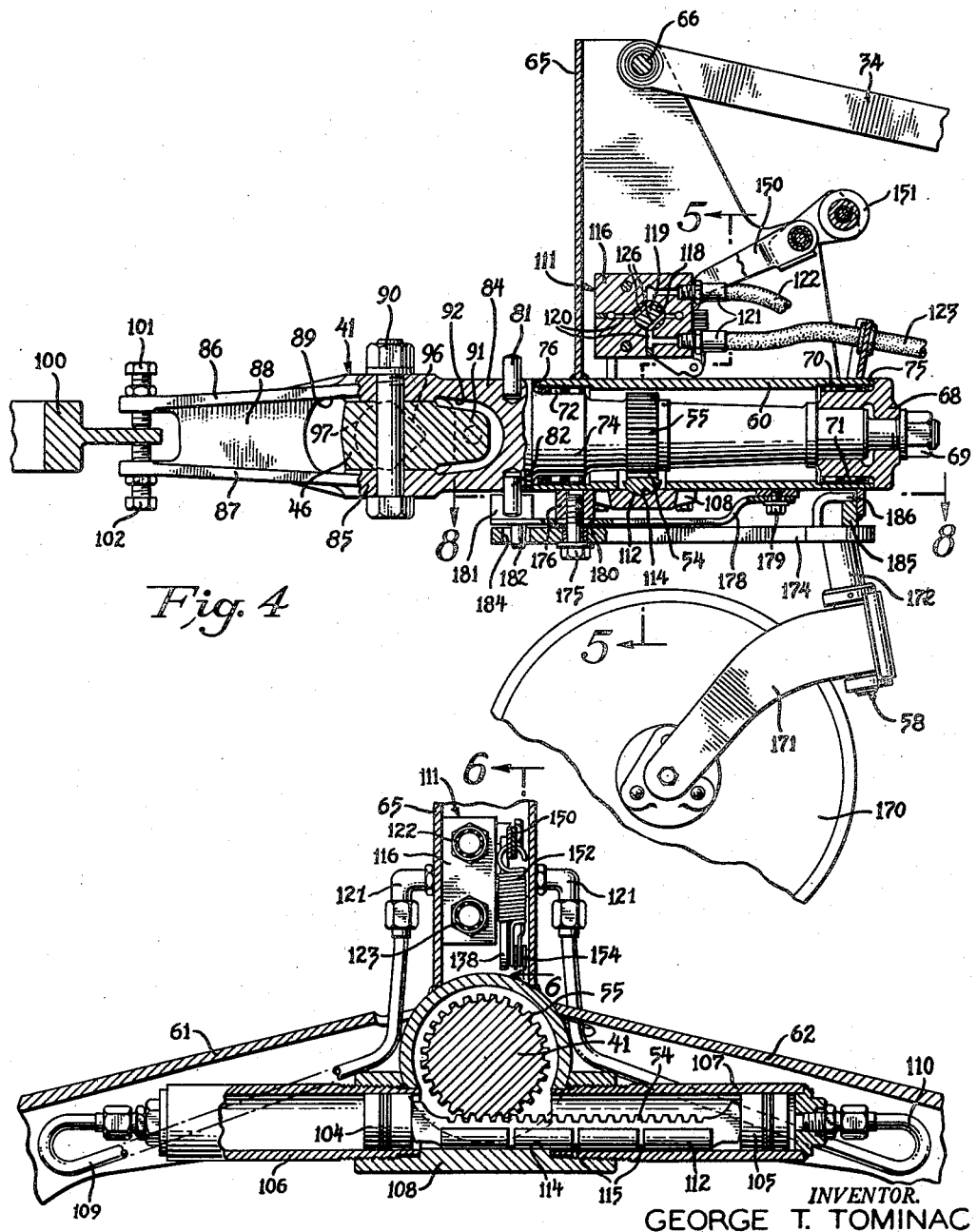

INVENTOR.
GEORGE T. TOMINAC

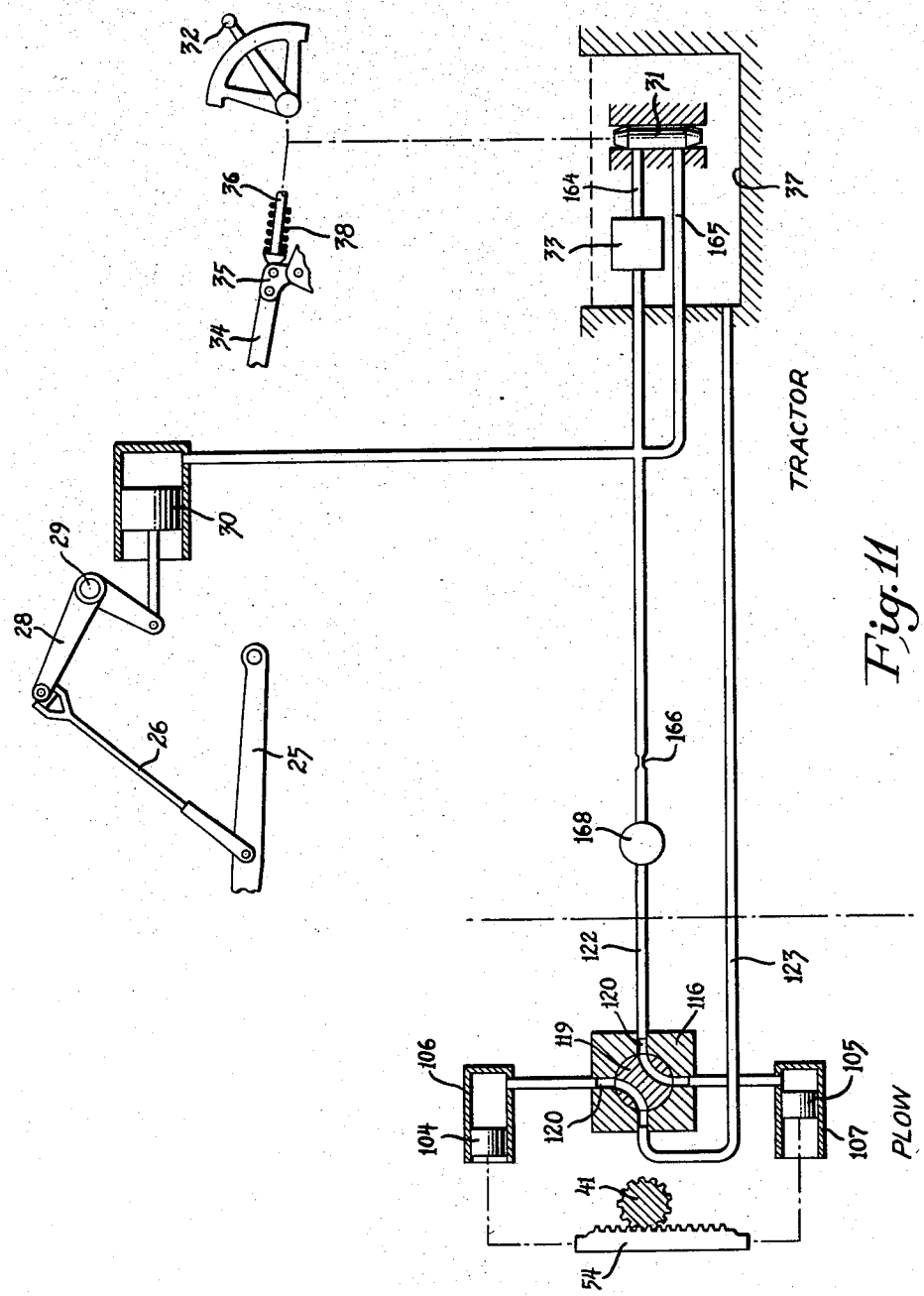

2,891,459
Patented June 23, 1959

United States Patent Office

2,891,459

TWO-WAY PLOW

George T. Tominac, Dearborn, Mich., assignor to Massey-Ferguson, Inc., a corporation of Maryland Application October 15, 1954, Serial No. 462,473

11 Claims. (Cl. 172—210)

The invention relates to tractor mounted two-way plows and more particulraly to two-way plows of the type having right and left-hand plow bottoms supported so that they may be rocked about a fore-and-aft axis to position the plow bottoms for operation alternately.

One object of the invention is to provide an improved plow of the above general character particularly adapted for use with tractors equipped with hydraulic lifts such, for example, as that of the Ferguson system, and which is adapted to utilize the tractor hydraulic system for effecting the selective changeover for right or left-hand operation in a manner permitting more efficient use of the plow and materially reducing the strains imposed on the parts of the tractor and the plow incident to the changeover.

A more specific object is to provide changeover mechanism for plows of the above type which, by reason of its novel construction and interconnection with the tractor hydraulic system, is able to move a very heavy load, such as double sets of right and left-hand plow assemblies, from one position to the other in a minimum of time and with relatively little shock or slam as the assemblies are brought into their final positions of adjustment.

Another object is to provide improved means whereby the lead or lag of the plows, that is, their angular disposition with respect to the line of travel of the implement, may be easily and accurately adjusted for most efficient operation.

Still another object is to provide improved means for adjusting the tilt of the plow, i.e., the angular positions of the bottoms with respect to a horizontal plane, when in working position.

It is also an object of the invention to provide improved means for indexing the swinging coulter commonly provided in two-way plows.

Other objects and advantages of the invention will become apparent from the following detailed description of the preferred embodiment illustrated in the accompanying drawings in which:

Fig. 4 is a fragmentary sectional view of the plow taken in a plane substantially along the line 4—4 of Fig 2.

Fig. 5 is a fragmentary sectional view taken in offset planes substantially along the line 5—5 of Fig. 4.

Fig. 11 is a diagrammatic view showing the manner in which the hydraulic mechanism of the plow is interconnected with the hydraulic system of the tractor.

Figure 1:
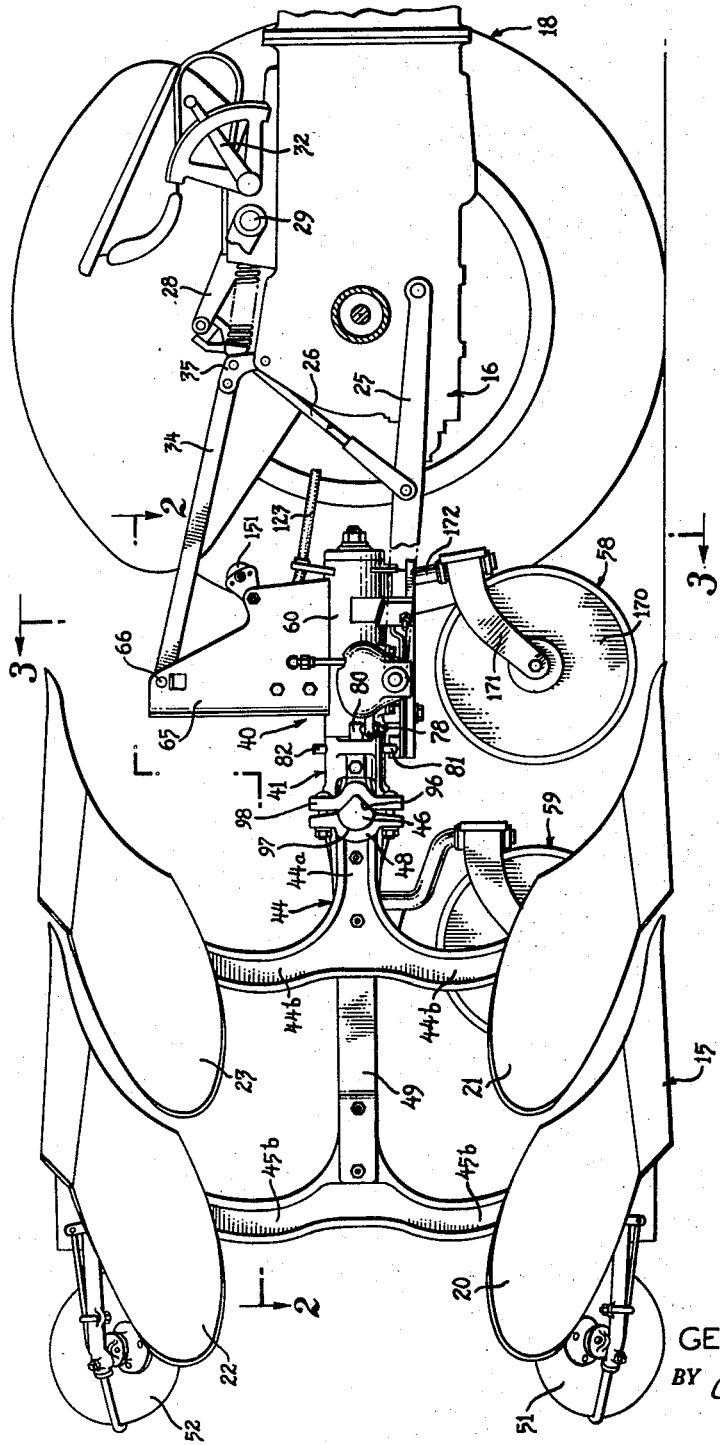
Figure 1 is a side elevational view of a two-way plow embodying the features of the invention, the plow being shown as coupled to a conventional tractor, the rear portion only of which has been illustrated.

While the invention has been shown and is described in some detail with reference to a particular embodiment, there is no intention that it be limited to such detail. On the contrary, the intention here is to cover all alternative constructions, modifications, and equivalents falling within the spirit and scope of the invention as defined by the appended claims.

Referring now to the drawings, a two-way, two-bottom plow 15 embodying the invention is here shown carried by an elevatable rear hitch 16 on the aft portion of a farm tractor shown at 18. The exemplary plow includes two pairs of plow bottoms or units 20, 21 and 22, 23, although it will be understood that certain features of the invention may be used to advantage with plows or comparable implements having more or less than two ground engaging elements in each set. As shown, each pair of plow bottoms 20, 21 and 22, 23 is alternately positionable to engage the ground and cut right and left furrows, respectively, as the tractor advances. The plow 15 may be raised to lowered transport position by the tractor hitch 16 and, in accordance with the invention, the sets of working plow bottoms are interchanged in response to raising and lowering the hitch.

Only the rear end of a tractor, partially broken away, has been shown at 18 in Fig. 1. In this instance, the elevatable implement hitch 16 is of the hydraulically actuated type disclosed in Ferguson Patent No. 2,118,180, issued may 24, 1938. The hitch comprises, in general, a pair of laterally spaced forwardly converging draft links 25 trailingly pivoted to the tractor body for vertical and limited horizontal swinging motion. A pair of drop links 26 connect the respective draft links 25 to a pair of lift arms 28 carried by a lift shaft 29 journaled on the tractor and rocked by a hydraulic ram 30 to raise the draft links under the control of a tapered hitch valve 31 movable by a quadrant lever 32 (see also Fig. 11). The valve 31 either permits intake of fluid to a pump 33 from a sump 37 so that pressured fluid is supplied behind the ram 30, permits fluid to drain from behind the ram 30 to the sump 37, or closes off both lines so that fluid is neither added to nor drained from the ram 30.

The hitch also includes a top or control link 34 which cooperates with the quadrant lever 32 in actuating the valve 31 for substantially maintaining uniform draft on the implement. As herein shown, the top link 34 is pivoted at its forward end to a rocker member or shackle 35, in turn pivoted to the tractor and operatively connected to control the valve 31 through a control plunger 36 (Fig. 11) biased by a main control spring 38. As explained in the above-mentioned Ferguson patent, the draft on an implement is transmitted by the control link 34 as a forward thrust against the control spring 38. The deflection of the spring and consequent displacement of the control plunger 36 proportional to the draft force actuates the control valve 31 to effect the raising or lowering of the draft links 25 thereby maintaining the draft force on the implement constant for a given setting of the quadrant lever 32. In soil of generally uniform texture, the implement is thus maintained at a selected constant depth of operation.

The plow 15 as here shown comprises as its main elements a hollow welded frame assembly 40 adapted to be carried by the tractor hitch 16 and journaling a main beam 41 rotatable within limits about an axis fore-and-aft of the tractor. A pair of supporting arms or plow beams 44, 45 are connected in spaced relation to the main beam 41 through a crossbar 46 pivoted to the latter and receiving clamping assemblies for each of the arms.

Figure 2:
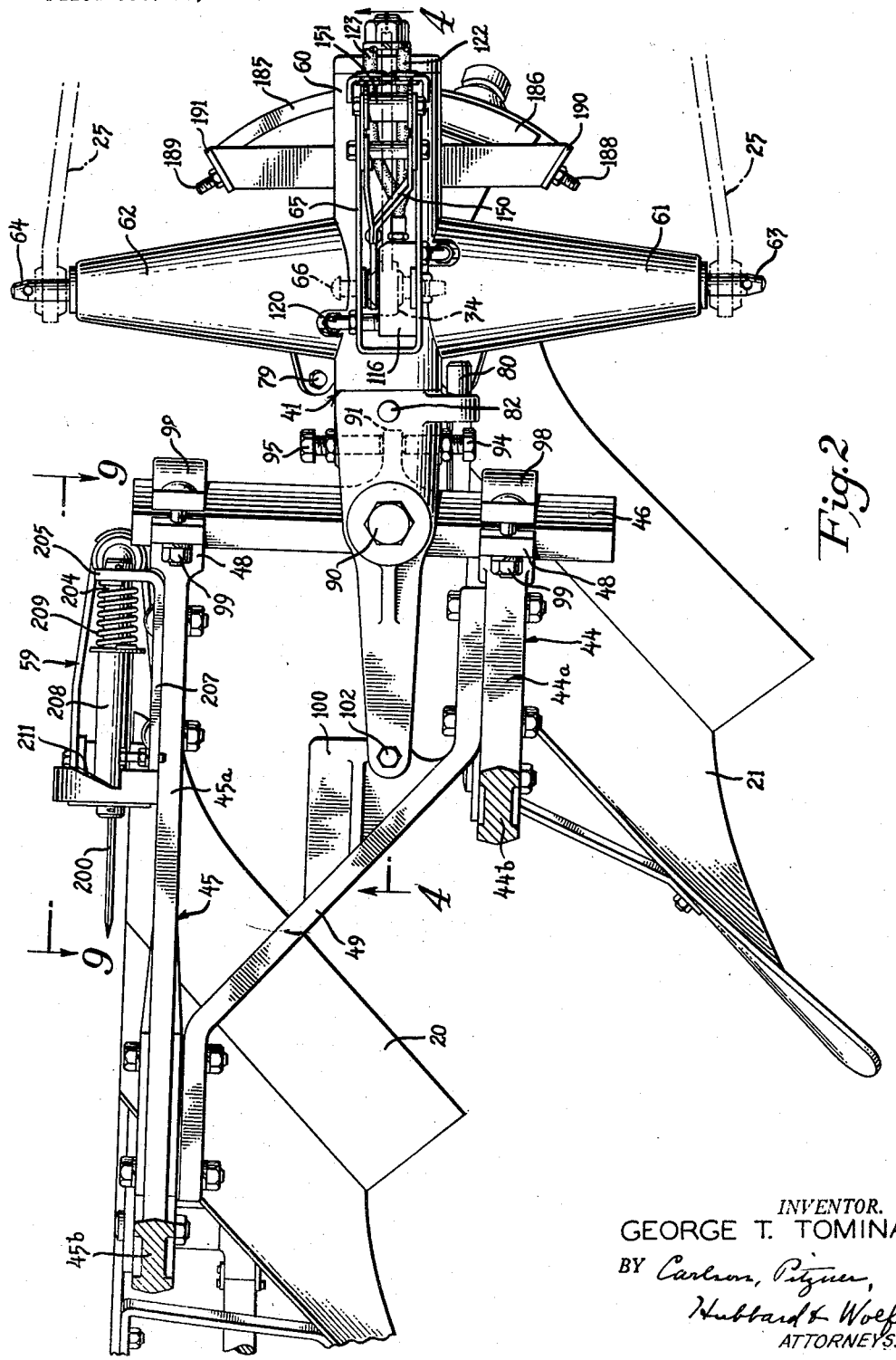
Fig. 2 is a sectional view taken in offset horizontal planes substantially on the line 2—2 of Figure 1.

The plow beams 44 and 45 are generally similar in shape, each having a shank 44a and 45a and forked portions 44b and 45b spread at 180° in the general form of an anchor (Figs. 1 and 2). The shanks are provided at their forward ends with clamp portions 48. The beam for the trailing plow units has a longer shank 45a, its rigidity being enhanced by a diagonal brace 49 bolted between the plow beams. The shorter beam 44 carries the two leading plow units 21, 23 at the extremities of its respective forked portions 44b, while the longer beam 45 similarly carries the two trailing plow units 20, 22. The right and left pairs 20, 21 and 22, 23 of plow units are thus spaced at 180° and adapted to be brought alternately into engagement with the ground upon rotation of the main beam 41. The construction of the several plow units themselves may be of any preferred character. Preferably, the trailing units 20, 22 are equipped with furrow wheels 51, 52 to absorb side thrust.

Hydraulic power means acting through a longitudinally shiftable rack 54 cooperating with a pinion 55 fast on the beam 41 is provided for rotating the beam. As herein shown, the power means and associated parts are disposed within the frame assembly 40, together with control means automatically actuating the hydraulic means from the tractor hydraulic system upon elevation of the hitch 16. The plow sets 20, 21 and 22, 23 are thus alternately placed in working positions, i.e., to cut right or left furrows each time the plow 15 is raised to and lowered from the transport position.

In the interest of weight reduction and economy, a single front coulter 58 and a single rear coulter 59 are provided, each mounted by indexing means to work in front of either leading and either trailing plow unit, respectively. The coulters are laterally shifted automatically for this purpose upon indexing of the plow sets as will be described later. Such shifting of the front coulter 58 is accomplished by an improved mechanism coupling it to the rotatable main beam. The rear coulter 59 is pivotally mounted, adapting it to swing under the influence of its own weight.

*Frame assembly*

Referring in more detail to Figs. 1 through 5, the frame assembly 40 includes a hollow cylindrical housing 60 extending fore-and-aft of the tractor. Oppositely extending transverse hollow arms 61, 62 are welded or otherwise rigidly attached to communicate with the interior of the housing 60. The arms 61, 62 carry at their extremities mounting pins 63, 64 adapted for insertion through captive balls swiveled in the trailing ends of the draft links 25. An upright U-shaped strut or bracket 65 is welded to the top of the housing 60 and carries near its upper end a transverse pin 66 removably insertable through a captive ball in the trailing end of the top control link 34. The entire housing assembly 40 is formed of relatively thin sheet steel fabricated to form the hollow parts described. It provides maximum strength with a minimum of weight, an important factor in the support of the relatively great weight of the four plow bottoms. Additionally, such a frame affords extreme compactness for the plow organization and protection for the hydraulic actuating and control means which are disposed within its confines, as explained more fully below. Substantially all of the internal space afforded by the hollow frame is efficiently utilized for protectively mounting the plow indexing mechanism and controls therefor.

The main beam 41 is journaled in the housing 60 and extends rearwardly to receive the crossbar 46 and plow beams 44, 45. The forward end of the beam 41 is capped by a bearing sleeve 68 (Fig. 4) secured to the beam as by a retaining nut 69. The sleeve has a land surface 70 journaled in a forward bearing 71 carried within the housing. At the aft end of the housing 60, a second bearing 72 engages a land surface 74 formed integrally on the main beam 41. The beam 41 is thus freely rotatable about its longitudinal axis within the housing 60. Radial flanges 75 and 76 on the bearing cap 68 and integral with the beam itself, respectively, engage the opposite ends of the housing 60 to prevent longitudinal play of the beam 41.

To provide for accurate positioning of the plow units, provision is made for restricting rotation of the beam 41 within predetermined adjustable limits. As herein shown, the restricting means comprises a pair of adjustable screw stops 78, 79 (Fig. 1) threaded into lateral projections on the housing 60 and engaged alternately by an axial stud 80 fixed in a lug on the aft portion of the beam 41. In the exemplary implement, the permissible rotation of the beam may be varied between 180° and approximately 140° by appropriate adjustment of the stops 78, 79. It is set, as an average, at about 165°. The aft portion of the beam 41 also carries a pair of rigid pins 81, 82 extending radially at diametrically opposite points displaced 90° from the stud 80. These constitute a part of the front coulter adjusting mechanism as will appear more fully below.

To provide for mounting the crossbar 46, which carries the plow units, the rear end portion of the beam 41 is bifurcated to present spaced parallel side portions 84, 85 terminating, in this instance, in tapering rearwardly extending arms 86, 87. As shown in Fig. 4, the arms 86, 87 may be reinforced by a connecting web 88 which terminates short of the side portions 84, 85, thus leaving a transverse opening 89 through the beam for the accommodation of the crossbar 46.

Preferably, the crossbar 46 is formed with an enlarged central portion flattened at opposite sides as shown in Fig. 4 and adapted to fit snugly between the side portions 84, 85. To provide for adjusting the lead or lag of the plow units, the crossbar 46 is secured to the beam so that it may pivot about an axis transverse to the axis of the beam 41, in this instance by a king bolt 90 inserted through alined apertures in the side portions 84, 85 and in the central portion of the crossbar.

Angular positioning of the crossbar 46 relative to the beam 41 for such adjustment may be conveniently effected and maintained through the medium of a centrally located tab 91 integrally formed on the crossbar and extending forwardly therefrom into a recess 92 provided in the beam. A pair of stop screws 94, 95 threaded in the beam and extending into the recess 92 are adapted to engage opposite sides of the tab 91. Upon complementary loosening and tightening of the stop screws 94, 95, the bar 46 may be swung to adjust the lag or lead of the plow units which are, as mentioned heretofore, carried by the plow arms 44, 45 connected to the crossbar.

The crossbar 46 is also formed with a special cross sectional shape permitting swinging adjustment of the plow beams to vary the tilt angle. By this means, slight inaccuracies in manufacture or assembly may be compensated to equalize the suck between the oppositely pitched plows in respect to the longitudinal axes of the main plow beams. As here shown, the leading edges 96 of the end portions of the bar 46 are V-shaped while the trailing edges 97 are curved or rounded in cross section (Figs. 1 and 4). The plow beam clamp portions 48 have curved faces for slidably mating with the bar's trailing edge 97. Cooperating clamp caps 98 have V-shaped faces for engaging the leading edge. These clamp caps may be tightened by bolts 99 to rigidly embrace, with the clamp portions 48, the crossbar 46. Loosening permits the plow beams 44, 45 to be removed from the bar 46, or to have their lateral working positions adjusted relative to the tractor, or relative to one another.

The clamp connections and bar cross section permit easy and accurate adjustment in the tilt angle of the plow units. For effecting such adjustment, a plate 100 rigid with the brace 49 between the two plow beams 44, 45, is disposed between the rear extremities of the tapered arms 86, 87 on the beam as shown in Fig. 4. The arms carry opposed adjustment bolts 101, 102 bearing on opposite sides of the plate 100. Upon loosening of the clamp caps 98, the adjustment bolts 101, 102 may be complementally screwed in and out to rock the plow beams about the longitudinal axis of the crossbar 46. The clamp portions 48 slide relative to the bar's curved trailing edge 97. When the desired angle of tilt is achieved, tightening of the clamp caps 98 locks the plow beams in the selected position.

Hydraulic indexing mechanism and control

In accordance with another aspect of the invention, novel hydraulic operating and control valve mechanism is provided for indexing the plow units, that is, for rotating the beam to position the plow units alternately to operating positions. The hydraulic operating mechanism in its preferred form comprises a pair of rams 104, 105 in opposed hydraulic cylinders 106, 107 protectively disposed in the respective frame arms 61, 62 (Fig. 5). Each cylinder 106, 107 is threaded at its inner end into a fitting 108 which is bolted, welded, or otherwise fixed beneath an opening in the housing 60. Conduits 109, 110 connected to the outer closed ends of the cylinders 106, 107 extend upwardly through the arms 61, 62 to a control valve assembly 111 mounted within the upright strut 65. The rack 54 is floatably disposed between the two rams 104, 105 and meshed with the pinion 55 on the beam 41. The rack 54 has a convex lower bearing surface 112 (Fig. 4) slidably engaging in a concave saddle or guideway 114 defined in the fitting 108. As shown in Fig. 5, the bearing surface 112 is interrupted by oil grooves 115 to insure adequate lubrication. Alternate pushing of the rams 104, 105 under hydraulic pressure shoves the rack 54 back and forth and thereby rotates the beam 41 in opposite directions.

Figure 7:
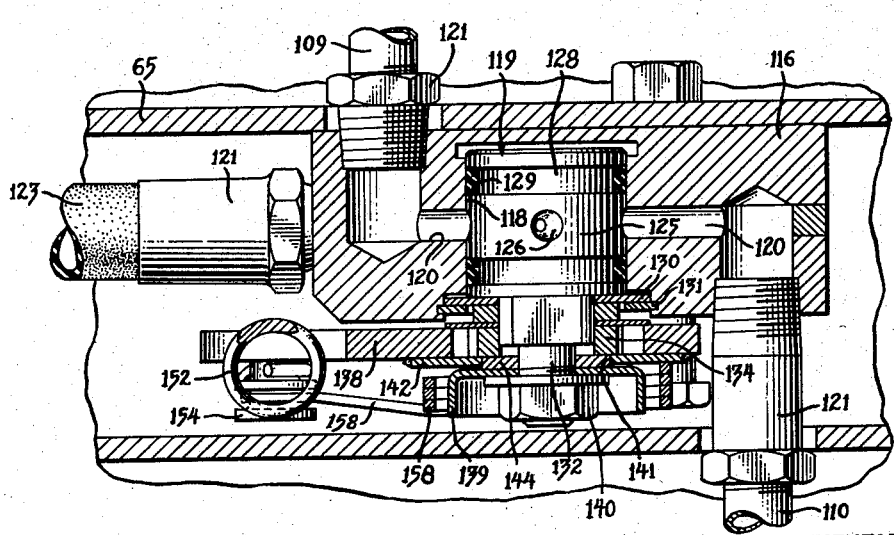
Fig. 7 is a sectional view through the valve mechanism taken in a plane substantially on the line 7—7 of Fig. 6.

The control valve mechanism 111 comprises a four-way reversing valve interposed between the hydraulic cylinders and the pressure pump 33 and sump 39 of the tractor's hydraulic system, and valve actuating means operable in response to the raising and lowering of the hitch links 25 and implement. The valve, as shown in Fig. 7, includes a body 116 in the form of a generally rectangular block defining a cylindrical chamber 118 for a movable valve member 119 and into which four passages or ports 120 open at points uniformly spaced apart circumferentially of the chamber (Fig. 4). For convenience of installation, two of the passages 120 open at the front face of the valve body 116 and the other two open respectively at the sides of the body in ports designed to receive fittings 121 for the connection of inlet and outlet lines 122 and 123 leading to the tractor, and the cylinder conduits 109 and 110.

In the exemplary valve, the movable valve member 119 comprises a rotor disposed in the chamber 118. The rotor 119 has a land portion 125 of enlarged diameter bearing against the chamber wall in the vicinity of the passages 120. This land portion has defined in it, two passageways 126 each communicating with two points spaced at 90° intervals around its cylindrical surface (see also Figs. 4 and 11). The passageways 126 are thus adapted to connect the inlet line 122 with one of the cylinder conduits 109 or 110, and the outlet line 123 with the other cylinder conduit. Upon rotation through 90°, the rotor passageways 126 reverse such connections, connecting the cylinder conduit 109 or 110 to the outlet line 123 and the other cylinder conduit to the inlet line 122. Successive 90° rotations of the rotor 119 cause the cylinders 106 and 107 to be alternately filled and drained with pressured fluid from the tractor's hydraulic system. Therefore, the rams 104 and 105 move complementally to push the rack 54 back or forth each time the rotor is stepped 90°.

In order that the rotor 119 be sealed against the leakage of the pressured fluid, it is formed with annular recesses 128 on either side of the land portion, and suitable packing material 129 is placed therein to bear against the chamber wall. The rotor 119 is held in place by a washer 130 and a retainer 131 snapped into a groove around the entrance to the chamber 118. The rotor 119 further includes a shank 132 extending from such entrance to carry a stepping mechanism and present opposite flattened portions for receiving a drive element.

The stepping mechanism is provided to rotate the valve rotor 90° each time the plow is raised by the tractor's hitch. As exemplified here, such stepping mechanism includes the drive element formed as a four-tooth ratchet 134 fast on the flattened portions of the rotor shank 132. For one-way stepping of the ratchet 134 a cooperating pawl 135 is slidably biased by a spring 136 in a guide slot 137 of a ratchet arm 138. The ratchet 134 and ratchet arm 138 are mounted on the rotor shank 132 and locked thereon by a retaining washer 139 and a nut 140 threaded on the end of the shank. To this end, the ratchet arm 138 has an aperture 141 over which an annular bearing plate 142 is welded, the bearing plate in turn being journaled on a collar 144 carried by a reduced portion of the shank 132. The arm 138 may thus rotate about the longitudinal axis of the shank.

The ratchet arm 138 is rotated clockwise by a linkage comprising a lever 150 (Fig. 4) pivoted in the upright strut 65 and having a roller 151 on one end engaged by the top link 34 which approaches the strut in a scissoring action as the hitch 16 is raised. This rocks the lever 150 clockwise as viewed in Fig. 4, or counterclockwise as viewed in Fig. 6. The opposite end of the lever is connected through a lost motion spring 152 to a pin 154 in the ratchet arm 138 which effects clockwise rotation of the latter upon elevation of the hitch. The pawl 135 carries the ratchet 134 and rotary element 119 along in such rotation of the ratchet arm. The rotational displacement for each engagement of the pawl 135 with the ratchet 134 is limited to 90° by the abutment of a stop ear 155 with a fastening bolt 156 which also serves to mount the body 116 in the upright strut 65. The ports 126 of the rotary element 119 are thus accurately alined each time the element is repositioned by the pawl and ratchet.

Figure 6:
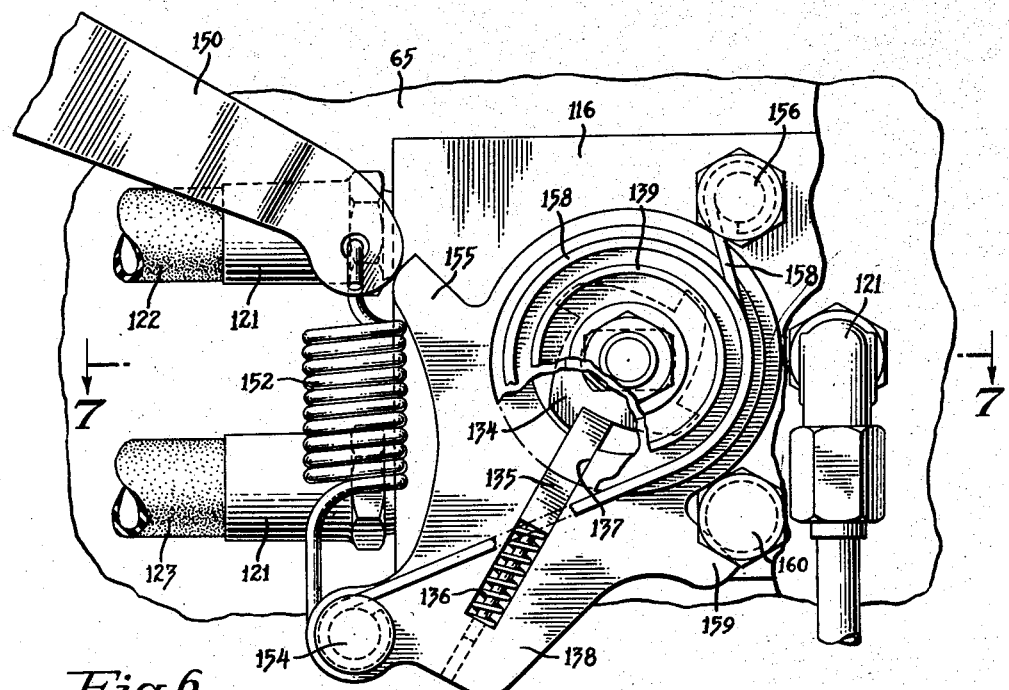
Fig. 6 is a side view of the control valve and the valve actuating mechanism with parts broken away and with the supporting structure partially broken away in a plane substantially along the line 6—6 of Fig. 5.

The ratchet arm 138 is returned to its original position upon lowering of the hitch links by a coiled torsion spring 158 connected between the bolt 156 and the pin 154. The spring encircles the shank 132 to bias the arm 138 in a counterclockwise direction (Fig. 6). Upon such return, the spring 136 yields to let the pawl 135 slip freely over the ratchet teeth. The return is limited by a second stop ear 159 engaging a second fastening bolt 160 through the valve block 116, as shown in Fig. 6.

The valve connects the hydraulic rams 104, 105 to the pressure system of the tractor as illustrated diagrammatically in Fig. 11. The tractor's hydraulic system, here shown as the type more fully described in Fergusion Patent 2,118,180, comprises the sump 37 containing a suitable fluid, such as oil, together with the pump 33 adapted to be continuously driven by the tractor's prime mover. The longitudinally movable tapered valve 31 complementally controls the intake 164 from the sump 37 to the pump 33 and a return line 165 from the apparatus to which the pump supplies fluid pressure. The pump 33 here supplies pressured fluid to the ram 30 which is connected through the lift arms 28 and drop links 26 to the hitch links 25. Such fluid under pressure serves to elevate the hitch links and raise the plow carried by them to transport position. Fluid is returned to the sump through the exhaust line 165 when the valve is moved upwardly to close the intake 164 to the pump 33 and open the exhaust line. The valve 31 is linked for controlled movement to the plunger 36 which is shifted against the bias of the control spring 38 under the influence of draft forces applied by the top link 34. By permitting the pump 33 to supply more fluid to the ram 30 or by venting the ram to the sump 37, the valve 31 maintains a constant draft on the implement connected to the hitch linkage. As explained previously, for an implement working in soil of generally uniform texture, this maintains the depth of operation substantially constant.

The inlet and outlet lines 122, 123 from the control valve assembly 111 are connected respectively to the ram 30, i.e., to the pump 33 in parallel with the ram, and to the sump 37, the former connection including a restricted orifice 166. As indicated above, the plow's hydraulic mechanism, or more specifically, its energized ram (either 104 or 105), is connected in parallel with the hitch ram 30 and can only receive operating pressure when the hitch ram itself is under pressure.

Front coulter

In accordance with well-known practice in the construction of two-way plows, coulters are provided for knifing through sod and debris ahead of the plow units. It has been known to provide, in the interest of weight reduction and economy, a single coulter to work with either the right or left plow unit, together with means for automatically shifting the coulter laterally upon changing of working units so that it always leads the plow unit which is engaged with the ground.

Such practice is followed in the presently illustrated two-way, two-bottom plow. The single front coulter 58 is employed, automatically indexed by an especially advantageous and novel mechanism upon alternation of the right and left plow units. Similarly, a simple and unique mounting for the rear coulter 59 adapts it to lead either the left or the right rear plow unit, depending on which is in the ground engaging position.

Figure 8:
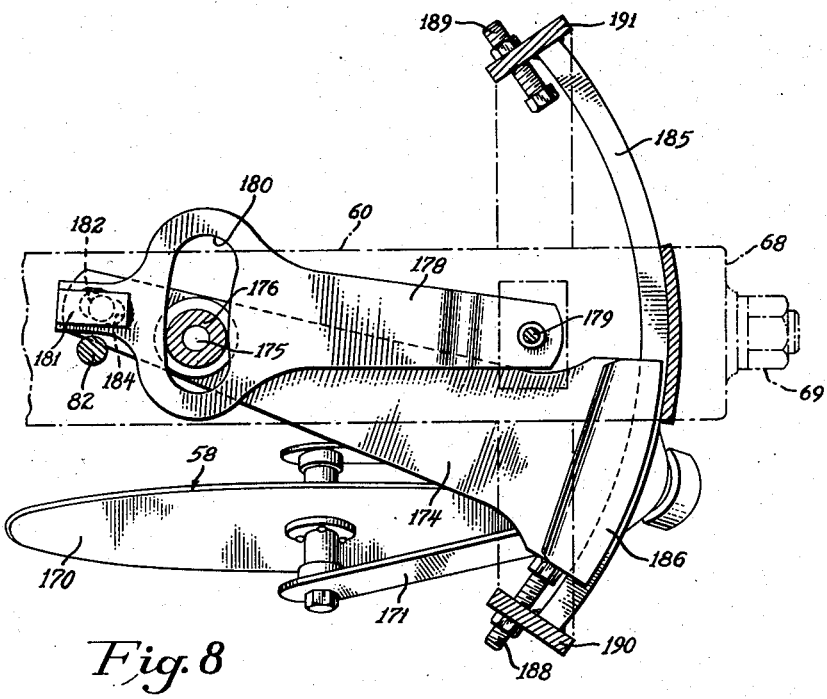
Fig. 8 is a plan view partially in section, of the front coulter supporting and indexing mechanism taken in a horizontal plane substantially on the line 8—8 of Fig. 4.

The front coulter 58 (Figs. 1, 4, and 8) comprises a circular blade 170 rotatably carried between the arms of a fork 171 pivoted on a stem 172. The latter is secured to the forward end of a support arm 174 which is pivoted on a vertical axis near its other end by a bolt 175 threaded in a tapped sleeve 176 welded to the underside of the housing 60. Means are provided to swing the arm 174 about such axis automatically in response to the changing or indexing of the plow sets to working positions, the resultant lateral positioning of the blade 170 placing it in front of the lower or working front plow unit 21 or 23 as the case may be.

Such means, in the instance here shown as embodying improved features according to the invention, include an intermediate link 178 pivoted to swing about a vertical axis forward of the arm pivot bolt 175. Such pivotal mount of the link 178 is provided by a bolt 179 threaded into a tapped boss welded to the underside of the housing 60. The link 178 is disposed between the arm 174 and the housing 60 and has an arcuate slot 180 through which the arm bolt 175 passes, permitting the link to swing without interference from such bolt. The aft end of the link 178 has an upright lug or boss 181 located to be engaged by either of the rigid pins 81 and 82 on the main beam 41. Upon rotation of the latter, one of the pins 81, 82 pushes against the lug 181 to swing the link 178 about its forward axis.

The link also has a projection or pin 182 at its aft end entering downwardly into a longitudinal slot 184 defined in the arm 174. Upon swing of the link 178, the pin 182 thus causes the arm 174 to pivot about its bolt 175 and to thereby laterally position the coulter blade 170. The pin 182 slides longitudinally in the slot 184 during such movement as indicated by dashed lines in Fig. 8.

The forward end of the arm 174 is supported against bending by rearward and downward shock forces on the coulter blade by an arcuate guide rail 185 welded at its medial portion to the underside of the housing 60. The rail has an upper ledge on which an angled support 186, welded to the top of the arm, rides. Adjustable end stops for limiting and determining the extreme positions for the arm 174 are afforded by bolts 188, 189 threaded in radial plates 190, 191 welded to the ends of the guide rail 185. Lock nuts retain the stop bolts in selected positions of adjustment.

The self-indexing front coulter is particularly enhanced by the use of the intermediate link 178 which permits the beam pins 81, 82 to bear at substantially right angles against the lug 181 throughout the full range of coulter swing. If the pins 81, 82 engaged a lug directly on the arm 174, such lug would execute an arc of relatively short radius and become skewed to the direction of pin travel. However, in the arrangement described, the lug 181 on the link turns through an arc of larger radius, i.e., about the pivot bolt 179, so that for the same lateral displacement it is skewed to only a slight degree from the direction of pin travel. For a given diameter of the beam 41 and lateral travel of the beam pins 81, 82, a greater and easier swing of the coulter arm 174 is thus achieved.

And, while this front coulter arrangement permits it automatically to be indexed laterally upon rotation of the beam, strength and rigidity are also provided by the guide rail 185 supporting the front portion of the arm 174.

Rear coulter

Figure 9:
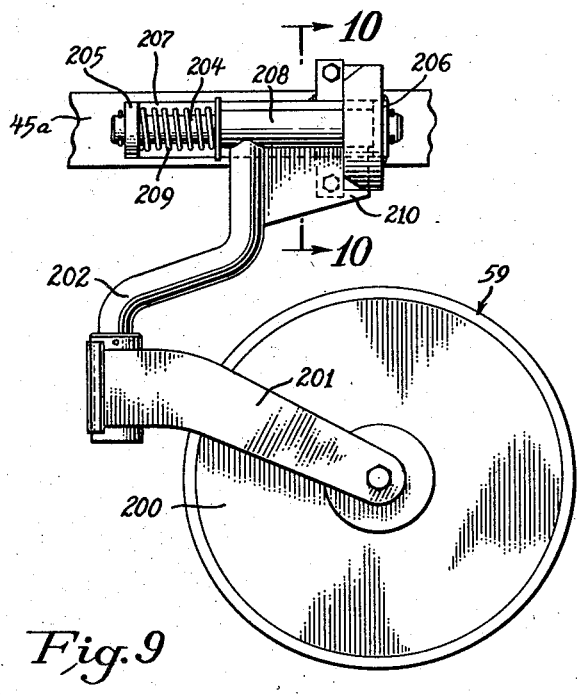
Fig. 9 is a fragmentary side view of the plow showing details of the mounting for the rear coulter.
Figure 10:
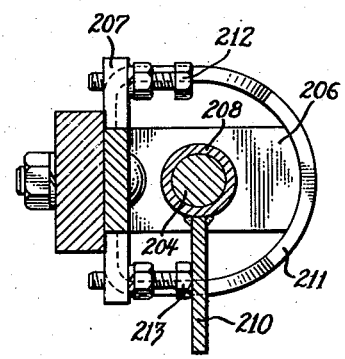
Fig. 10 is a sectional view taken in a vertical plane substantially on the line 10—10 of Fig. 9.

The rear coulter (Figs. 2, 9, and 10) comprises a circular blade 200 rotatably carried between the arms of a fork 201 pivoted on the end of a stem 202. In accordance with the improved mounting contemplated by the present invention, means are provided for journaling the stem to swing about an axis substantially coincident with the axis of the plow beam 45 for the rear units 20, 22. In this instance, a pin 204 is disposed between longitudinally spaced ears 205, 206 of a bracket 207 bolted to the shank 45a. A sleeve 208, to which the stem 202 is welded, is both rotatably and axially slidable on the pin 204, having freedom to swing up to 180°. As the main beam 41 is rotated and the shank 45 is turned over during the indexing of the plow sets, the weight of the stem 202 and blade 200 swings them to a depending position, the blade always thus riding in front of the working aft plow unit 20 or 22 as the case may be.

In order to stabilize the rear coulter and prevent it from swinging randomly when the plow is raised to transport position, spring means, yieldable under the coulter's weight, are provided for restraining its movement until the shank 45a is actually turned over. As here shown a compression spring 209 biases the sleeve 208 toward one end of the pin 204, urging a radial, cam-following ear 210 on the sleeve into engagement with an arcuate cam 211 which may be an integral part of the bracket 207. The cam has end depressions or slanted notches, rising at its center portion, so that the spring 209 urges the ear 210 into one end position or the other, thereby holding the coulter stem 202 and sleeve 208 against free swing. The spring 209 is, however, deformable under the coulter's weight to permit the blade to assume a depending position in front of the aft plow unit whenever the beam 45 is actually turned over.

A pair of adjustable stop screws 212, 213 are threaded into the bracket 207 to be engaged by the sides of the cam-following ear 210. These serve to limit the extremes of the coulter's swing and determine the angle at which the coulter depends from the shank. Such adjustment is made to match the angle through which the beam 41 is rotated, providing true leading of the coulter when either deep or shallow furrows are being plower, as explained more fully below.

Resume of operation

Figure 3:
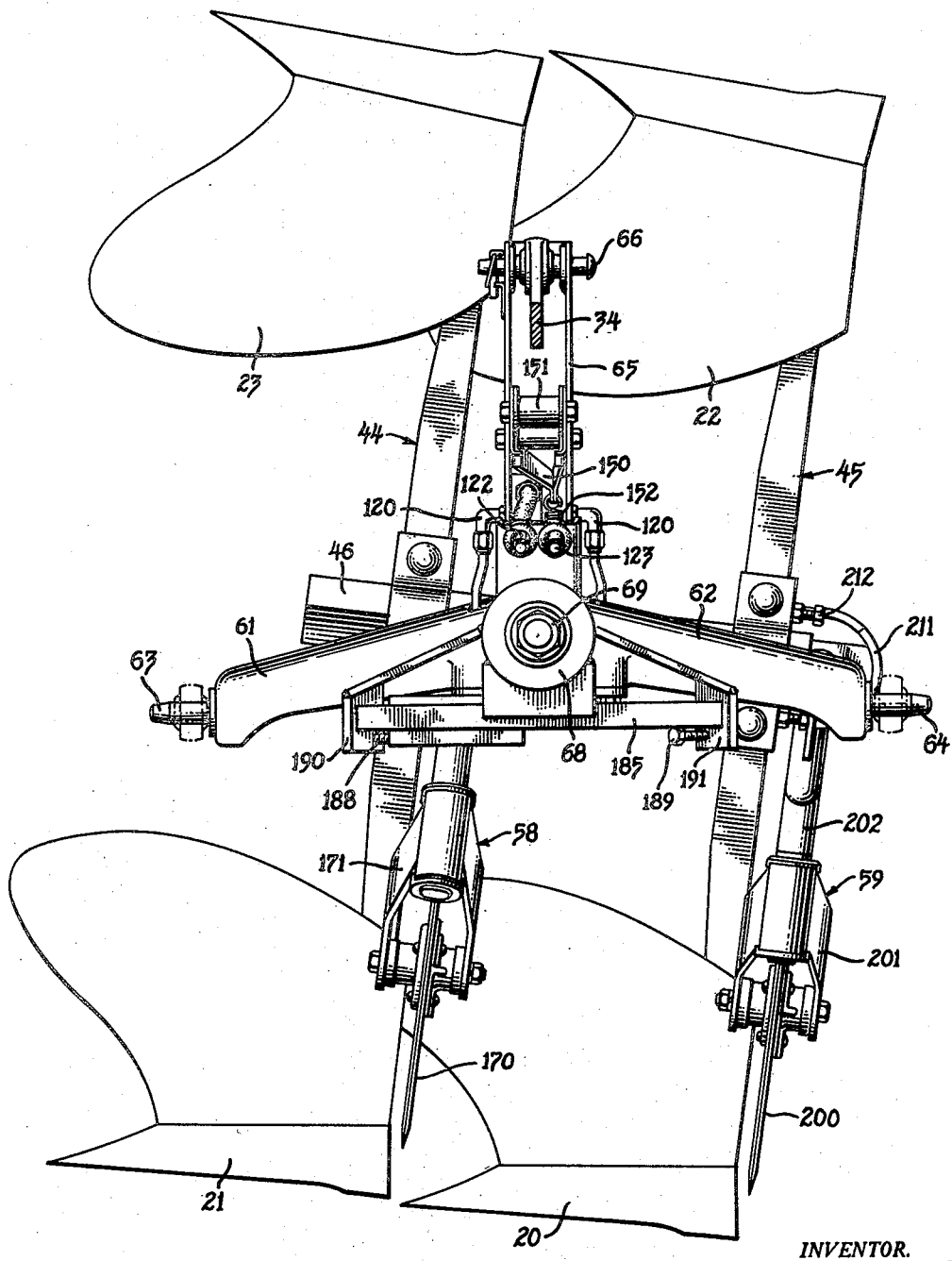
Fig. 3 is a front view of the plow shown in Figure 1, couplings in the tractor being shown in section substantially along the line 3—3 in Figure 1.

With the plow indexed as shown in Figs. 1, 2 and 3, the right plow set 20, 21 is in the lowered working position to turn furrows to the right of the tractor's center line. The right set of plows is lowered into working position by the hydraulic hitch 16 on the tractor which may then also serve to maintain the draft or depth of operation substantially constant as the tractor advances. When the end of the field or furrow is reached, the operator need only raise the hitch by actuating the quadrant lever 32. This raises the working set of plows from the ground and at the same time scissors the top link 34 and upright strut 65 together so that the link 34 engages the roller 151 and rocks the valve actuating lever 150. This in turn, steps the ratchet arm 138 (Fig. 6) 90 degrees until the first stop ear 155 engages the fastening bolt 156. The pawl 135 is engaged with a tooth of the ratchet 134 at this time and thus serves to change the rotational position of the rotor 134 by 90 degrees, thereby reversing the connections of the inlet and outlet lines 122, 123 to the two respective cylinder conduits 109, 110. With the hitch elevating ram 30 receiving fluid pressure as the hitch is being elevated, pressured fluid is thereupon supplied to the left cylinder 107 (viewed on the right in Fig. 5), which was previously connected by the valve to the tractor's sump 37, and the right cylinder 106, which was previously receiving pressured fluid, is vented to the sump 37. This causes the two rams 104, 105 to move to the left as viewed in Fig. 5, thus pushing the rack 54 to the left and rotating the main beam 41 clockwise as viewed in Fig. 5. The rotation of the main beam 41 may be up to 180 degrees in extent, but may be limited by the engagement of the forwardly extending pin 80 on the aft end of the beam with the left stop bolt 79.

With the restricted orifice 166 (Fig. 11) interposed in the line supplying pressured fluid through the rotary valve to the right cylinder 107, the speed at which the beam 41 rotates is reduced and restrained to a relatively low value. As the rack 54 approaches the end of its permissible travel or the pin 80 hits the stop bolt 79, there is thus no slamming or shocking of the engaging parts or undue stresses on the plow arms 44, 45. Yet because the pressure available is relatively great, a sufficient force is available to rotate a beam which carries a great weight, for example, the entire plow unit shown which may weigh up to eight hundred pounds. Slow, positive rotation without slam or shock is therefore assured.

The restricted orifice 166 may be made to slow the rotation of the main beam 41 to such an extent that the plow 15 is not fully indexed to its new position by the time that the hitch links 25 have reached the transport position. As explained in the previously mentioned Ferguson patent, when the hitch links 25 reach their upper limit, the tapered valve 31 is centered by the control plunger 36 to close both the pump intake line 164 and the exhaust line 165 (Fig. 11). The weight of the plow 15 therefore pressurizes the fluid captured in the hitch ram 30, and such pressure continues to be applied through the control valve 116 to the indexing cylinder 107 until the plow is fully indexed and limited by one of the stop bolts 78 or 79. With fluid transferred from the hitch ram 30 to the indexing cylinder, the hitch links 25 will drop slightly from their uppermost position, and this will result in the tapered valve 31 opening the pump intake 164 to supply additional fluid to the hitch ram 30 and return it to full transport position. The plow 15, therefore, remains in uppermost transport position as it completes its relatively slow indexing movement. It will be understood, of course, that the plow is completely indexed in a matter of seconds, but it is slowed sufficiently to prevent shocking or jarring of the parts.

Since the main beam 41 is automatically indexed to locate the left set of plows 22, 23 in working position upon raising of the hitch 16, it is only necessary to turn the tractor around and lower the hitch in order that the left set of plows may be used to cut furrows on the return traverse of the tractor. The automatic draft or depth control is equally effective in maintaining the operating position of the left set of plows constant as the tractor advances. This depth of operation for the plows is determined by the setting of the quadrant lever after the hitch has been lowered.

With the plow 15 indexed originally as shown in Figs. 1, 2, and 3, the front coulter blade 170 is located at the right of the tractor's center line leading in front of the forward right plow 21. As the beam 41 is rotated the radial pin 82 shown uppermost in Fig. 2 strikes the left side of the lug 181 on the rear end of the coulter link 178, swinging the latter counterclockwise about its pivot bolt 179. The depending pin 182 at the rear end of the coulter link 178 thus pushes the coulter arm 174 to the left, swinging it counterclockwise (Fig. 8) about its pivot bolt 175. This swings the forward end of the coulter arm 174 to the left of the tractor's center line and places the front coulter blade 170 in working position ahead of the front left plow unit 23.

The rear coulter blade 200 was originally depending to operate in front of the rear right plow unit 20, but upon rotation of the main beam 41 and the plow beams 44, 45 carried by it, the weight of the rear coulter blade 200, fork 201 and stem 202 causes the spring 209 to yield and the sleeve 203 to rotate on the pin 204 so that the blade 200 flips over to depend from the rear plow beam shank 45a in working position ahead of the left rear plow unit 22 when the hitch 16 is again lowered. In each case, the front and rear coulters are limited in their movement and their positions determined by the respective stop bolts 189 and 212.

In plowing operations, the rear tractor wheel on the side of the working plows is usually operated in the adjacent furrow with the opposite rear wheel on the unplowed or land side. This results in a tilting of the tractor about its longitudinal axis, the working plow side being lower. Manifestly, the greater the depth of plowing, the greater the degree of this tilt. It is desirable, nevertheless, that the working plow units be maintained in a substantially upright position regardless of the depth of plowing, i.e., that their moldboards be vertical with respect to the land surface. By providing the adjustable stop bolts 78, 79 and pin 80 for the main beam 41, the rotational travel of the beam upon indexing may be limited to less than 180 degrees. This has the effect of compensating for such tilting of the tractor, the rotational range of the main beam being made less as deeper furrows are cut. For very shallow plowing, the beam 41 would be rotated through 180 degrees to position the plow's moldboards vertically with respect to the land surface. Conversely, when deep furrows are being cut and the tilt of the tractor is relatively great, the stop bolts 78, 79 may be withdrawn to limit the rotation of the beam to about 150 degrees, the range of rotation being around 165 degrees for the usual depth of plowing.

Upon such adjustment in the range through which the main beam 41 rotates in indexing or alternating the plow sets, the lateral positions of the plow sets relative to the tractor are varied slightly. In order that the front and rear coulters properly lead the working plows, however, the stop bolts 188, 189 for the front coulter and the stop bolts 212, 213 for the rear coulter may be adjusted to limit their swing and place the blades 170 and 200 directly in front of the corresponding working plows. For example, when the plow 15 is operated to a relatively great depth and the rotational range of the beam 41 limited by the beam stop bolts 78, 79, the plow sets will work at positions displaced by a relatively small amount from a vertical plane through the longitudinal center line of the tractor. Under such conditions, the front coulter stop bolts 188, 189 are screwed in to a considerable degree to permit the coulter blade to swing into proper alinement with the front plow set. The rear coulter stop bolts 212, 213, on the other hand, are retracted to limit the swing of the sleeve and stem and thus hold the rear coulter in line with the rear plow set. Exact location of the two coulters in front of their working plows may be accomplished by a proper setting of the bolts. When the plow units are being worked to only a slight depth, on the other hand, they reside substantially directly under the shanks of the plow beams, and, in such case, the swing of the front coulter is limited by retracting the stop bolts 188, 189. The rotational swing of the rear coulter is increased by screwing the rear coulter stop bolts 212, 213 inwardly so that the stem 202 and blade 200 depend substantially vertically from the plow beam shank 45a.

It is but a simple matter to adjust the fore-and-aft tilt angle of the plows, thereby maintaining them horizontally disposed at various depths of plowing and preventing any serious tendency to dig deeper or ride out of the ground. The clamp caps 98 may be loosened and the opposed adjustment bolts 101, 102 complementally screwed to swing the plow beams 44, 45 about the longitudinal axis of the crossbar 46. The clamp portions 48 on the forward ends of the plow beams 44, 45 slide easily over the mating curved surface of the crossbar's trailing edge 97. The bolts 101, 102 in themselves serve to hold the plow beams 44, 45 in a selected tilt position, but tightening of the clamp caps 98 further locks them due to the non-rotatable embracing engagement with the V-shaped leading edge 96 of the crossbar 46.

The lag or lead angles of the plows relative to the longitudinal center line of the tractor, i.e., the tractor's direction of travel, may also easily be adjusted by loosening the king bolt 90 and complementally adjusting the bolts 94, 95 to swing the integral tab 91 on the crossbar 46 within the beam's cavity 92. The crossbar 46 itself is thus pivoted about the king bolt 91, and tightening of the king bolt clamps it in a selected position for the desired lag or lead angle. This adjustment makes possible the realization of operation with a truly forward pull on the plow 15 when different plow units or worn plow units having different amounts of side thrust are employed. Any tendency of the plow to swing the tractor or to make steering difficult can be eliminated by the simple adjustment of the lag-lead stop bolts as described.

I claim as my invention:

1. In a two-way plow for use on a tractor having a hydraulic pressure system and an elevatable rear hitch actuated thereby, the combination comprising a housing adapted to be mounted on the rear hitch, a rotatable main beam journaled in said housing, a pair of plows mounted in spaced relation from said beam to be brought alternately into working positions upon limited rotation of the beam, hydraulic ram means for rotating said beam, and control means for connecting the tractor's hydraulic system to actuate said ram means automatically upon the raising of the rear hitch and the housing carried by it, said control means including a valve rotatable step-by-step in one direction, and mechanism engageable by the tractor hitch for imparting rotative steps to the valve.

2. In a two-way plow for use on a tractor, the combination comprising a rotatable main beam, a pair of plows mounted in spaced relation from said beam to be brought alternately into working positions upon limited rotation of the beam, a pair of opposed hydraulic rams adapted to be moved in unison, a rack disposed between said rams and given opposite longitudinal movement by each ram, said rack extending transversely of said beam, a pinion fast on said beam and meshed with said rack to rotate said beam upon actuation of said rams, valve means rotatable step-by-step for connecting said rams alternately to a source of pressure fluid on the tractor, and a pawl and ratchet mechanism for rotating said valve.

3. In a two-way plow adapted to be mounted on a tractor's power-elevatable rear hitch, the combination of a housing, a main beam journaled in said housing, a pair of plows mounted in spaced relation from said beam to be brought alternately into working position upon limited rotation of the beam, hydraulic means for imparting such rotation to said beam, a rotary valve for controlling said hydraulic means, a ratchet wheel connected to said rotary valve, and a pawl engaged with said ratchet wheel and mounted to be actuated as an incident to elevation of the rear hitch, whereby said beam is rotated automatically when the plow is raised.

4. In a two-way plow adapted to be mounted on a tractor's power-elevatable rear hitch, the combination comprising a rotatably positionable main beam, a pair of plows mounted in spaced relation from said beam to be brought alternately into working positions upon limited rotation of the beam, adjustable stop means engageable by the beam for defining the working position, hydraulic means for imparting such rotation to said beam, control means actuated automatically incident to the raising and lowering of the hitch for controlling said hydraulic means, and a restricted orifice interposed between said hydraulic means and a hydraulic pressure source to retard the speed at which said beam is rotated and thereby minimize shock as the beam engages one of the stops.

5. In a two-way plow adapted to be mounted on the rear hitch of a tractor equipped with a hydraulic actuator for raising the hitch, the combination comprising a rotatable main beam, a pair of plows mounted in spaced relation from said beam to be brought alternately into working positions upon rotation of the beam, hydraulic ram means acting through a rack and pinion for imparting such rotation to said beam, and valve means connecting said hydraulic ram means to receive pressure fluid in parallel with the hydraulic actuator for said rear hitch, said connection conditioning said ram means to swing said main beam and select one of said plows for operation incident to a raising of the tractor's hitch and precluding actuation of said ram means to move the selected plow from working position when the hitch linkage is lowered.

6. In a two-way plow for use with a tractor, the combination comprising a hollow housing, a fore-and-aft main beam journaled in said housing, means for mounting a pair of plows on said beam spaced to be brought alternately into working positions upon rotation of the beam, a pair of hollow arms oppositely and transversely extending from said housing for receiving mounting hitch links on the tractor, a U-shaped strut extending upwardly from said housing for connecting to a hitch control link on the tractor, actuating means for rotating said beam protectively disposed in said arms, and control means for said actuating means protectively mounted in said strut.

7. In a two-way plow for use with a tractor, the combination comprising a hollow cylindrical housing, a fore-and-aft main beam journaled in said housing and extending rearwardly therefrom, means for mounting a pair of plows on said beam spaced to be brought alternately into working positions upon limited rotation of the beam, a pair of hollow arms extending oppositely and transversely from said housing and communicating with the interior thereof, the extremities of said arms being adapted for connection to mounting hitch links on the tractor, a U-shaped strut extending upwardly from said housing and adapted at its upper end for connection to a hitch control link on the tractor, a pair of hydraulic rams each including a piston disposed in one of said arms, a rack gear in said housing and floatedly disposed between said rams, a pinion gear fast on said beam and meshed with said rack gear to effect rotation of said beam upon movement of said rams, and a hydraulic control valve for said rams protectively mounted within said strut.

8. In an implement for use with a tractor having a pair of trailing pivoted lower links and a trailingly pivoted upper link and also a power lift device for raising the lower links, the combination of an implement frame, means pivotally connecting said frame with the trailing ends of the links for scissoring of the frame and upper link toward and from each other as an incident to the raising and lowering of the frame by the power lift device, a control valve carried by said frame, valve actuating means on said frame including a member pivotally mounted on the frame and having one end positioned to be engaged by the upper link and rocked thereby from a rest position to an operated position as the frame and upper link scissors toward each other, means operatively connecting said member with said valve, and means operative to restore said member to rest position as the upper link and frame scissors away from each other.

9. In a two-way plow for use with a tractor having a hydraulic system including a source of pressure fluid and a pressure fluid elevatable hitch linkage, the combination comprising a housing having means for mounting it on the hitch linkage, a rotatable beam journalled in said housing, a pair of plows mounted in spaced relation from said beam to be brought alternately into working positions upon limited rotation of the beam, hydraulic ram means operable to rotate said beam, control means including a two-position valve interposed between the source of pressure fluid on the tractor and said ram means effective in one position to cause said ram means to rotate said beam to locate one of said plows in working position and effective in the other position to cause said ram means to rotate the beam to locate the other of said plows in working position, and mechanism operable in response to the raising of the hitch linkage for shifting said valve from the position in which it has been set to its alternate position.

10. In a two-way plow for use with a tractor having a hydraulic system including a source of pressure fluid and a pressure fluid elevatable hitch linkage, the combination comprising a housing having means for mounting it on the hitch linkage, a rotatable beam journalled in said housing, a pair of plows mounted in spaced relation from said beam to be brought alternately into working positions upon limited rotation of the beam, hydraulic ram means operable to rotate said beam, control means including a two-position valve interposed between the source of pressure fluid on the tractor and said ram means effective in one position to cause said ram means to rotate said beam to locate one of said plows in working position and effective in the other position to cause said ram means to rotate the beam to locate the other of said plows in working position, a valve actuator operable to shift said valve alternately from one position to the other, and means for operating said actuator in response to the raising of the hitch linkage.

11. In a two-way plow for use with a tractor having a hydraulic system including a source of pressure fluid and a pressure fluid elevatable hitch linkage, the combination comprising a housing having means for mounting it on the hitch linkage, a rotatable beam journalled in said housing, a pair of plows mounted in spaced relation from said beam to be brought alternately into working positions upon limited rotation of the beam, hydraulic ram means operable to rotate said beam, control means including a two-position valve interposed between the source of pressure fluid on the tractor and said ram means effective in one position to cause said ram means to rotate said beam to locate one of said plows in working position and effective in the other position to cause said ram means to rotate the beam to locate the other of said plows in working position, and a valve actuator engageable by said linkage as it is raised for shifting said valve from one position to the other.

References Cited in the file of this patent

UNITED STATES PATENTS

| | | |
|---|---|---|
| 1,085,298 | Rideout | Jan. 27, 1914 |
| 1,724,635 | Bath | Aug. 13, 1929 |
| 1,817,552 | Galloway | Aug. 4, 1931 |
| 1,864,639 | Crezee | June 28, 1932 |
| 2,251,452 | Hirst | Aug. 5, 1941 |
| 2,262,432 | Rodder et al. | Nov. 11, 1941 |
| 2,374,016 | Henneuse | Apr. 17, 1945 |
| 2,385,950 | Silver | Oct. 2, 1945 |
| 2,543,786 | Lindeman | Mar. 6, 1951 |
| 2,611,301 | Ego | Sept. 23, 1952 |
| 2,618,211 | Fraga | Nov. 18, 1952 |
| 2,633,786 | Pursche | Apr. 7, 1953 |
| 2,637,256 | Lindeman | May 5, 1953 |
| 2,659,284 | Pursche | Nov. 17, 1953 |
| 2,697,973 | Silver et al. | Dec. 28, 1954 |
| 2,698,563 | Edwards | Jan. 4, 1955 |

FOREIGN PATENTS

| | | |
|---|---|---|
| 1,006,493 | France | Jan. 23, 1952 |
| 236,949 | Switzerland | July 16, 1945 |